United States Patent [19]

Isringhausen

[11] Patent Number: 5,632,300

[45] Date of Patent: May 27, 1997

[54] STEAM TRAP

[75] Inventor: C. Loren Isringhausen, Midlothian, Va.

[73] Assignee: Steamsphere Inc., Jerseyville, Ill.

[21] Appl. No.: 444,766

[22] Filed: May 19, 1995

Related U.S. Application Data

[63] Continuation-in-part of Ser. No. 363,059, Dec. 23, 1994, which is a continuation-in-part of Ser. No. 107,982, Aug. 18, 1993, Pat. No. 5,335,686.

[51] Int. Cl.$^6$ .................................................. F16K 1/00
[52] U.S. Cl. ........................ 137/269; 137/883; 137/887; 137/549; 55/466
[58] Field of Search .......................... 137/883, 14, 269, 137/887, 549; 73/29.04, 861.04; 55/466

[56] References Cited

U.S. PATENT DOCUMENTS

| | | |
|---|---|---|
| 144,565 | 11/1873 | Roos . |
| 2,342,050 | 2/1944 | Hurst . |
| 3,707,161 | 12/1972 | Crawford ............................ 137/614.17 |
| 3,715,870 | 2/1973 | Guzick . |
| 3,853,144 | 12/1974 | Whelan . |
| 3,877,895 | 4/1975 | Wonderland et al. .................. 210/447 |
| 4,426,213 | 1/1984 | Stavropoulos ........................... 55/466 |
| 4,541,456 | 9/1985 | Troy ......................................... 137/549 |
| 4,836,032 | 6/1989 | Redus et al. ........................ 73/861.04 |
| 5,137,556 | 8/1992 | Koulogeorgas ......................... 137/549 |
| 5,183,078 | 2/1993 | Sorrell ..................................... 137/883 |

*Primary Examiner*—A. Michael Chambers
*Attorney, Agent, or Firm*—Shoemaker and Mattare, Ltd.

[57] ABSTRACT

An offset steam trap is designed for removing condensed water from a horizontal steam pipe to which the trap is connected. The body of the trap contains a ball valve for permitting limited water flow out of the pipe through an orifice, and the body has an offset portion or flow barrier between its inlet and the orifice. The body is installed with the orifice effectively below the center line of the pipe, to prevent water from collecting in the bottom of the pipe.

1 Claim, 6 Drawing Sheets

STEAM TRAP

BACKGROUND OF THE INVENTION

This is a continuation-in-part of copending application No. 08/363,059, filed Dec. 23, 1994, which is a continuation-in-part of application Ser. No. 08/107,982, filed Aug. 18, 1993, now U.S. Pat. No. 5,335,686, issued Aug. 8, 1996.

This invention relates generally to pipe fitting, and more particularly to an offset steam trap.

Steam traps are actually condensate traps, installed in steam lines to remove water which condenses from the steam and would, if not removed, accumulate at low spots, presenting flow impediments and other inefficiencies.

Older systems had inverted bucket-type condensate traps, which contained moving parts and were prone to failure. Those were replaced by fixed-orifice devices, exemplified by U.S. Pat. Nos. 3,715,870 and 3,877,895. Some orifice traps now have replaceable orifices, so that they can be custom fit with an orifice plate or jet of optimum size. Experimentation is often required to find the best jet size.

To avoid the need to separate the steam line in order to change the orifice size, some inventors placed a ball valve in the system, and installed a removable jet or orifice in the ball. The valve housing might have a removable lateral plug, so that, with the valve temporarily closed, the jet could be removed and replaced, without having to break down the line. The jet is inserted into a hole through the center of the ball, aligned with the center of a horizontal pipe to which the valve is attached. With such an arrangement, however, some water can accumulate in the pipe, below the level of the orifice. Indeed, a horizontal pipe remains almost half full of water when the orifice is on the center line of the pipe. Uneven performance results when a pool of water lies in front of the orifice.

In application Ser. No. 08/107,982, now U.S. pat. No. 5,335,686, issued Aug. 8, 1996, I described a steam trap of the type just described. The invention described below improves upon the prior devices, with the aim of removing all water in the line adjacent the valve.

SUMMARY OF THE INVENTION

An object of the invention is to remove more water from steam systems having steam traps with replaceable orifices.

This and other objects are attained by providing a steam system with a steam trap according to the present invention. The body of the trap contains a flow restrictor in the form of a jet or orifice for permitting limited water flow out of the pipe through the orifice, and the body has an offset portion between the inlet and the orifice. The body is installed with the orifice effectively below the center line of the pipe, so that water cannot collect in the bottom of the pipe adjacent the orifice.

BRIEF DESCRIPTION OF THE DRAWINGS

In the accompanying drawings.

DESCRIPTION OF THE PREFERRED EMBODIMENT

Figure 3:
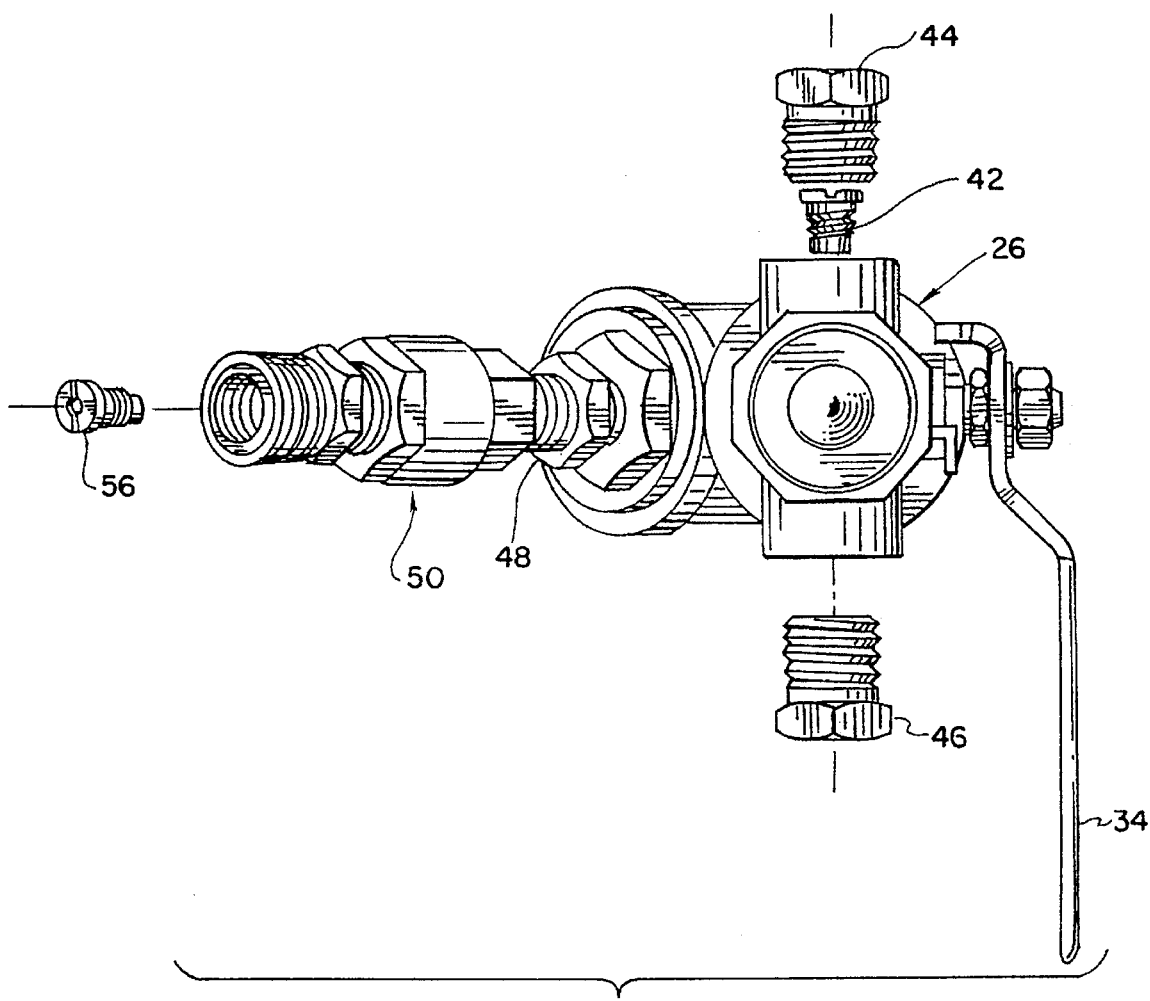
FIG. 3 is an end view thereof, from the downstream direction.

An offset steam trap embodying the invention includes a conventional Y-strainer fitting 10 having an inlet 12, a primary outlet 14, and a secondary outlet 16. See FIG. 3, which illustrates a sleeve 18 of wire screen material retained by a reducer 20 in the primary outlet. In conventional use, this screen separates particulate matter, and also provides a collection locus for water droplets, while a baffle 22 partially blocks the primary flow path.

Figure 1:
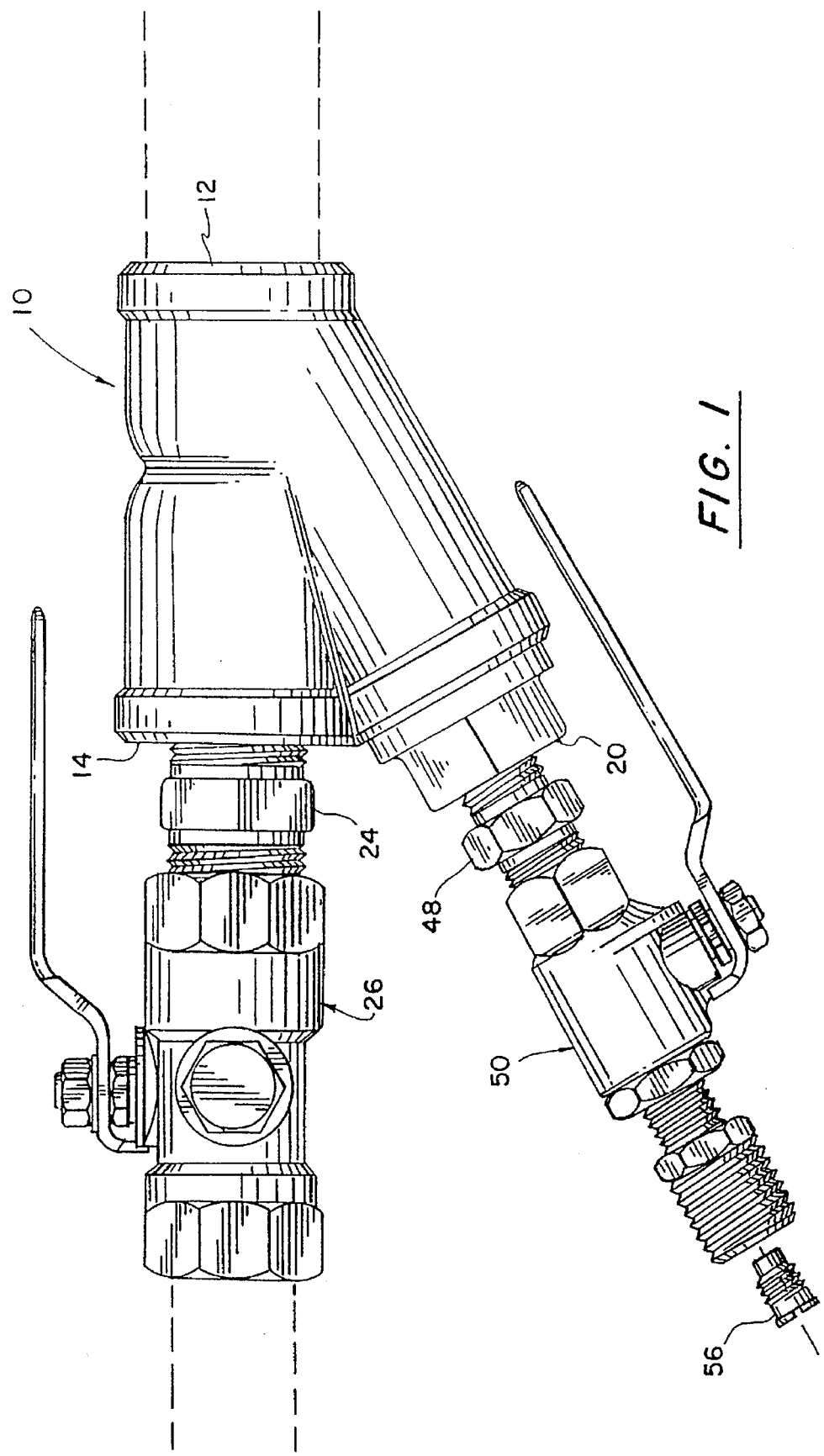
FIG. 1 is a side elevation of a prior orifice-type steam trap, as disclosed in application Ser. No. 08/107,982.
Figure 2:
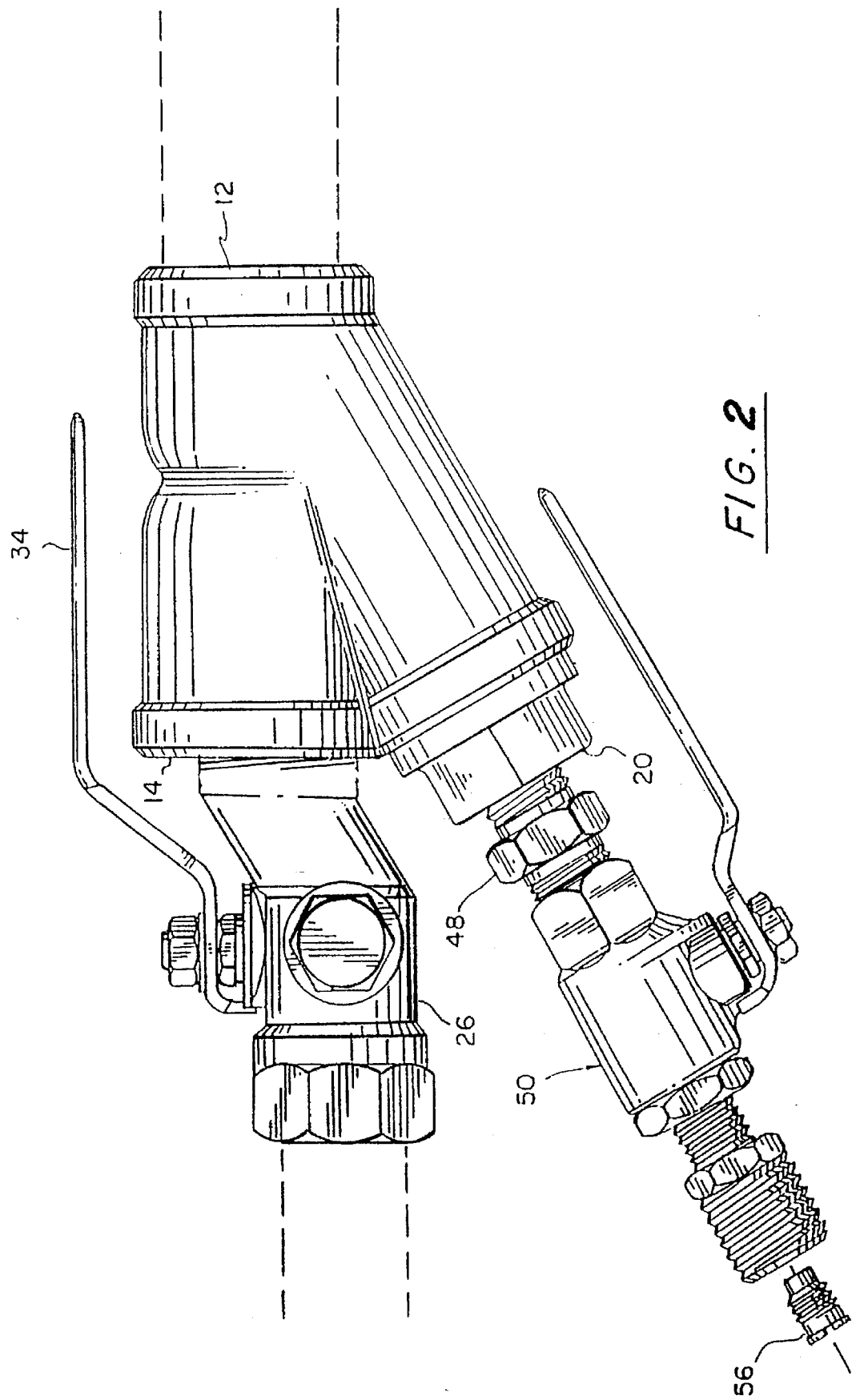
FIG. 2 is a side elevation of a steam trap having an offset portion according to the invention, to allow all water accumulated in a horizontal pipe adjacent the trap to escape through the trap back to a boiler.

A first nipple 24 connects the primary outlet to a main ball valve 26. This valve comprises a housing 28 with a flow path passing axially through it, and a ball element 30 connected to an actuator shaft 32. A handle 34 is affixed to the exposed end of the shaft, for turning the ball between an open position and a closed position. In the open position, a fluid path 36 through the ball is aligned with the flow path, while in the closed position, it is perpendicular to the flow path, and isolated from it by the seals 38, 40. Actually, the fluid path 36 extends through a main removable orifice or jet 42 installed in the ball. As FIGS. 1 and 2 show, there are plugs 44, 46 on either side of the ball, on an axis orthogonal to both the housing axis and the shaft axis. With the main valve closed, one of these plugs may be removed to gain access to the main jet, which then can be removed easily, safely, and without losing steam from the system. Thus, there is no need to shut the system down in order to change main jets. The main valve is normally open, except during such replacement.

The inlet of the main ball valve is offset with respect to the rest of the valve; that is, its center line is above the center of the ball, so that the orifice lies at least partly below the bottom of the inside diameter of the pipe.

The other arm of the "Y" includes a second nipple 48, installed in the reducer 20. This nipple supports an auxiliary valve 50, which may be a conventional ball valve containing an apertured ball 52 turned between on and off positions by a handle 54. A test orifice or jet 56 is installed in the distal end of a reducer threaded into one end of the auxiliary valve.

Figure 4:
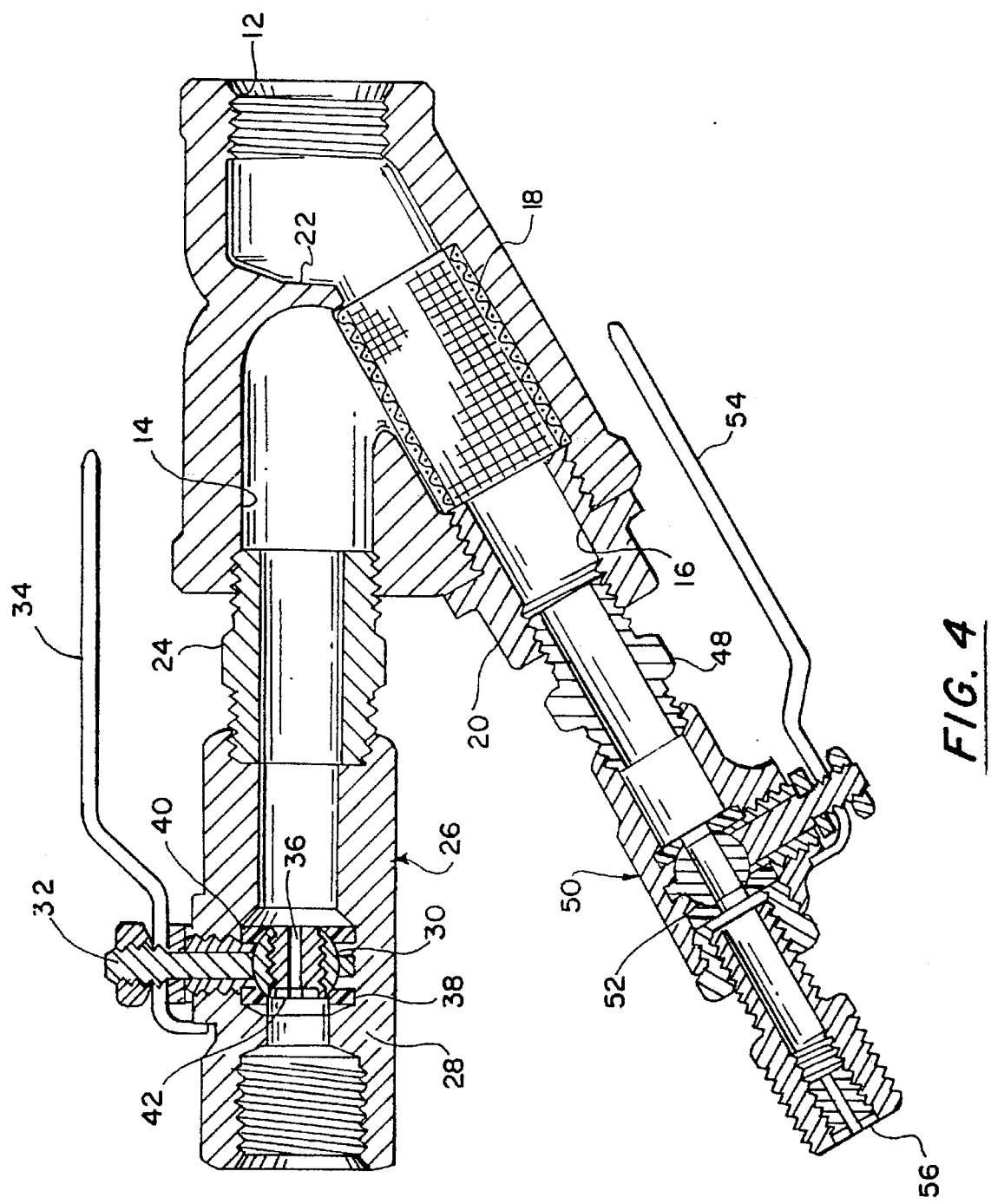
FIG. 4 is a sectional view along the plane 4—4 in FIG. 3.
Figure 5:
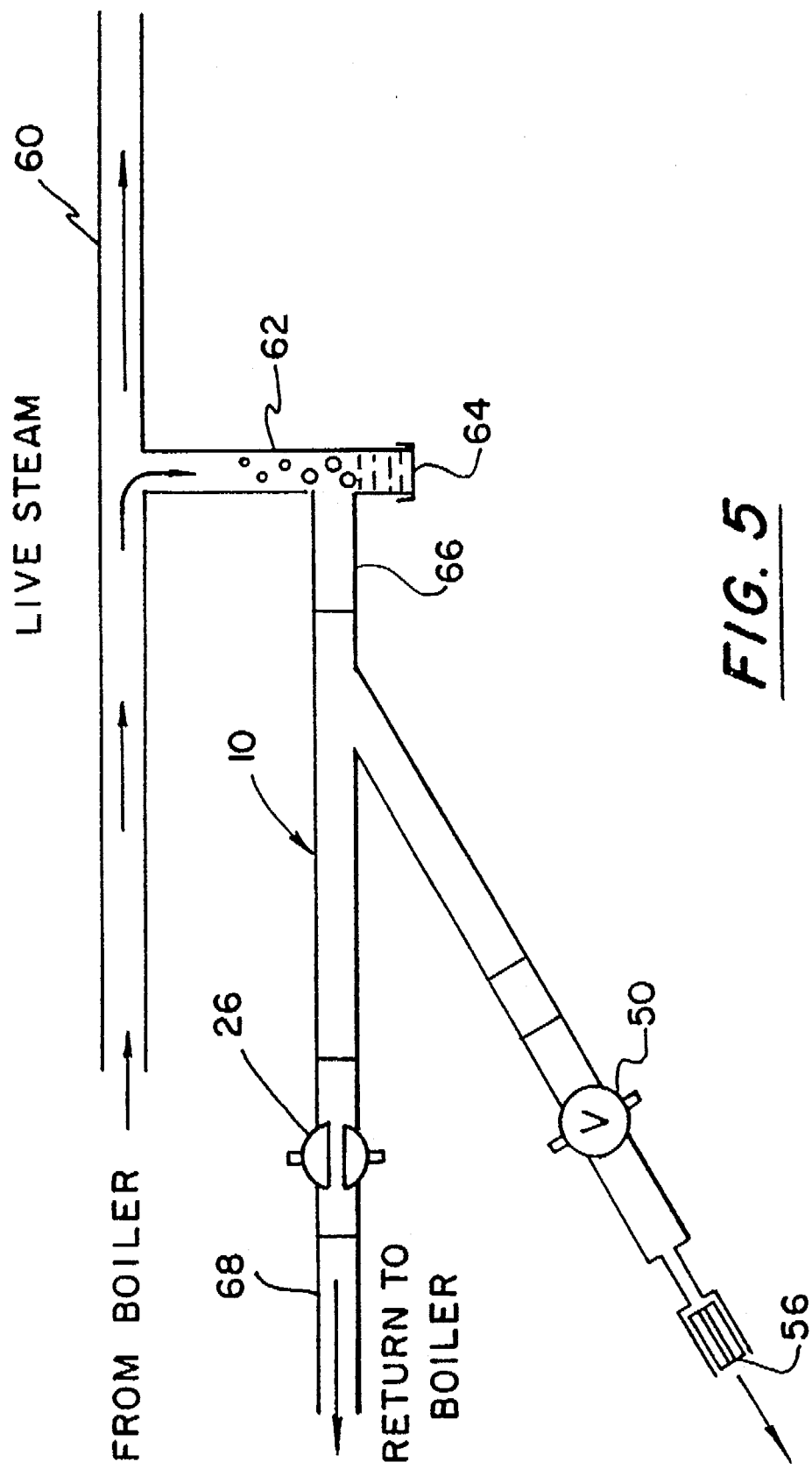
FIG. 5 is a diagram showing a portion of a steam system including the steam trap of FIG. 1.

FIG. 4 shows the device installed in a steam system. The live steam line, carrying steam from a boiler, is indicated by reference numeral 60. The steam trap would normally be installed at a low point in the line, to remove not only suspended droplets, but also water which has settled at the bottom of the pipe. Numeral 62 indicates a tee extending downward from the steam line. The lower arm of the tee is capped at 64, and the inlet 12 of the steam trap 10 is secured to the horizontal leg 66. With the system running, the main valve is fully open, and water passes to the boiler return line 68 through the main jet.

The auxiliary valve is normally closed, so one can replace the test jet simply by unscrewing it and installing a new one. One can install jets of various sizes in the auxiliary valve, and observe flow through the jet. Once jet size is optimized, the main jet in the main valve is replaced with one the same size as the test jet, or by the test jet itself.

Figure 6:
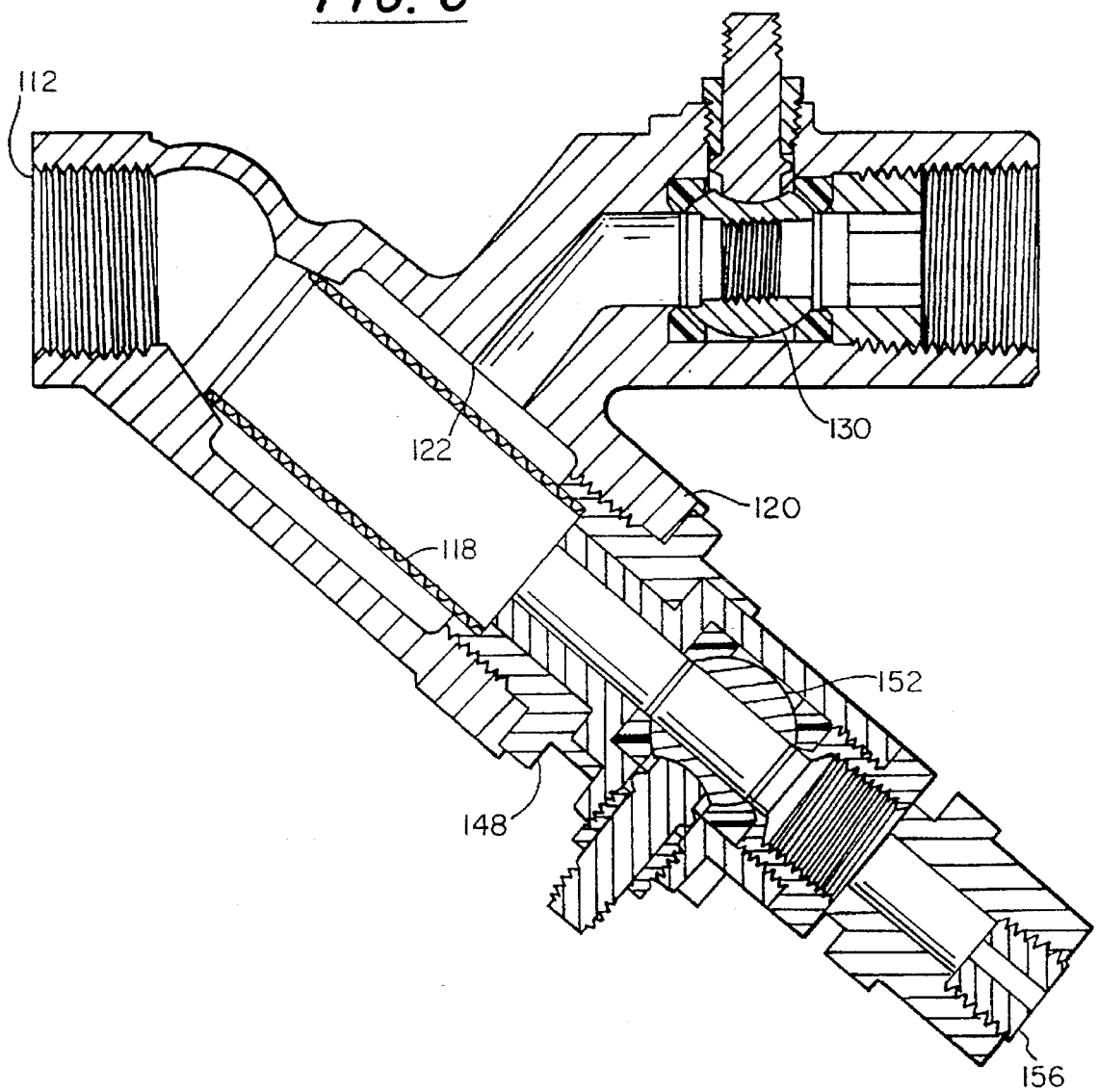
FIG. 6 is a cross-sectional view, like FIG. 4, of an alternative embodiment of the invention.

FIG. 6 shows an alternative form of the invention in which the body 120 of a Y-strainer fitting is designed so that the crotch 122 of the "Y", acting as an inverted dam, is below the bottom of the steam pipe. Exactly the same function is performed as in the embodiment of FIGS. 1–5: the water level is maintained at or below the bottom of the pipe. The reference numerals 112, 120, 130, 148, 152 and 156 identify components similar to those represented by similar numerals, less 100, in the prior figures. Note that the left-right orientation of FIG. 6 is opposite that of FIG. 4.

It should be understood that the most important feature of this invention is the offset effect produced by the offset or the dam, and that the invention could be practiced without the auxiliary valve described. Those components are shown and described because they are parts of the best mode of the invention now contemplated.

Since the invention is subject to modifications and variations, it is intended that the foregoing description and the accompanying drawings shall be interpreted as illustrative of only one form of the invention, whose scope is to be measured by the following claims.

I claim:

1. An offset steam trap for removing condensed water from a horizontal steam pipe having an interior and an end to which the trap is connected, comprising a body having an inlet adapted to be joined to said pipe end, and a flow restrictor in said body for permitting limited water flow out of said pipe through the orifice, said body having a flow barrier comprising an inverted dam extending to a level below the bottom of the steam pipe between said inlet and the flow restrictor, whereby the flow restrictor maintains a water level upstream of the dam at or below the bottom of the pipe so that water does not collect in the pipe.

* * * * *